United States Patent
Lin et al.

(10) Patent No.: US 9,742,293 B2
(45) Date of Patent: Aug. 22, 2017

(54) POWER SUPPLY AND METHOD OF POWER SUPPLYING

(71) Applicant: INNO-TECH CO., LTD., Taipei (TW)

(72) Inventors: Shu-Chia Lin, Taipei (TW);
Chih-Liang Wang, Taipei (TW);
Ching-Sheng Yu, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 15/224,719

(22) Filed: Aug. 1, 2016

(65) Prior Publication Data

US 2017/0214323 A1    Jul. 27, 2017

(30) Foreign Application Priority Data

Jan. 21, 2016    (TW) ................. 105101883 A

(51) Int. Cl.
*H02M 3/335*  (2006.01)
*H02M 1/08*  (2006.01)
*H02M 1/00*  (2006.01)

(52) U.S. Cl.
CPC ......... *H02M 3/33507* (2013.01); *H02M 1/08* (2013.01); *H02M 2001/0009* (2013.01)

(58) Field of Classification Search
CPC ......... H02M 3/33507; H02M 3/33523; H02M 3/335; H02M 3/33569; H02M 3/3385; H02M 3/33538; H02M 3/33515; H02M 3/33592; H02M 3/33576; H02M 3/33561; H02M 3/33546; H02M 3/156; H02M 3/1563; H02M 3/157; H02M 3/1584; H02M 5/4585; H02M 7/066; H02M 7/06; H02M 7/493; H02M 7/53871; H02M 7/7575; H02M 7/525; H02M 7/219; H02M 7/12; H02M 7/217; H02M 7/068; H02M 7/10; H02M 2001/0032; H02M 2001/0025;

(Continued)

(56) References Cited

U.S. PATENT DOCUMENTS

2009/0273297 A1*  11/2009  Kelly ................. H02M 1/4225
                                                       315/247
2011/0309760 A1*  12/2011  Beland ................ H02M 1/4258
                                                       315/201

(Continued)

*Primary Examiner* — Jue Zhang
*Assistant Examiner* — Kevin H Sprenger
(74) *Attorney, Agent, or Firm* — Lin & Associates Intellectual Property, Inc.

(57) ABSTRACT

A power supply and a method of power supplying for converting an external alternating power into an output power with appropriate voltage and power are disclosed. The power supply includes an input charging unit, an input filtering unit, a regulating unit, a transformer, a controller, an output unit, an output capacitor, a switching unit and a feedback unit. The regulating unit is connected to the input filtering unit and comprises a regulating capacitor and a regulator connected in series. The regulator is controlled by the controller to perform one of the working modes including initial open circuit, power on conduction, short circuit normal operation and over-voltage open circuit protection. Therefore, the present invention overcomes the problem of inrush current upon powering on, and particularly, the controller performs digital operation with flexibility to meet actual requirements by updating appropriate firmware of software program.

7 Claims, 3 Drawing Sheets

(58) Field of Classification Search
CPC .. H02M 2007/4815; H02M 1/36; H02M 1/32; H02M 1/4258; H02M 1/34; H02M 1/4225; H02M 1/4208; H02M 1/4233; G05F 1/33; G05F 1/335; Y02B 70/126; Y02B 70/1433; Y02B 70/1441; Y02B 70/16; Y02B 70/1475; Y02B 70/1491; H02H 7/127; H02H 7/1209; H02H 7/106; H02H 7/062; H02H 7/1206; H02H 7/1257
USPC ............ 363/21.01–21.18, 52–53, 76–81, 84, 363/125–127
See application file for complete search history.

(56) References Cited

U.S. PATENT DOCUMENTS

| | | | | |
|---|---|---|---|---|
| 2012/0106208 A1* | 5/2012 | Sugawara | ......... | H02M 3/33523 363/21.13 |
| 2014/0043867 A1* | 2/2014 | Sugawara | ......... | H02M 3/33523 363/21.15 |
| 2014/0078792 A1* | 3/2014 | Yabuzaki | ......... | H02M 3/33507 363/53 |

* cited by examiner

POWER SUPPLY AND METHOD OF POWER SUPPLYING

CROSS-REFERENCE TO RELATED APPLICATION

This application claims the priority of Taiwanese patent application No. 105101883, filed on Jan. 21, 2016, which is incorporated herewith by reference.

BACKGROUND OF THE INVENTION

1. Field of the Invention

The present invention generally relates to a power supply and a method of power supplying, and more specifically to a power supply employing a regulating capacitor and a regulator connected in series to couple to an input filtering unit, and utilizing a controller to manipulate the regulator to be open circuit when a rectifying voltage generated by the input filtering unit is too high so as to switch off a conduction path from the regulating capacitor to a grounded level and prevent electrical elements from damage due to high input voltage, and a method of power supplying for operating the power supply.

2. The Prior Arts

One of the crucial components in electrical industry is a power supply, which is intended to supply stable power with appropriate voltage and/or current, particularly for normal operation under continuous or abrupt change of the input power or the loading. For example, inrush current with tens or even hundreds ampere often occurs at initially powering on, and the fuse easily melts because the rating of working power $I^2t$ is suddenly exceeded. At this time, the power supply does not provide desire power and the normal operation and function of the application system are terminated. Furthermore, inrush current carries a very huge peak, which easily burns out all electrical elements configured in the rectifying bridge, switching transistor or clamping circuit, and even large noise interference is induced to affect other electronic devices using the same common power.

In the prior arts, a thermistor or called NTC (negative temperature coefficient) resistor is commonly used to suppress inrush current at powering on. Specifically, the thermistor exhibits the property of negative temperature coefficient. In other words, as the temperature of the thermistor increases, the resistance of the thermistor decreases. Thus, for most low-end applications, the thermistor is a practical solution for solving inrush current.

Further, the operation of the thermistor is described as below. The thermistor is serially inserted into the alternating power line or the DC line of the bridge type rectifier. When the power supply is initially powered on and the Buck-Cap is charged, the total impedance of the input line is about the sum of ESR of the capacitor and the impedance of the thermistor, that is, $ESR+R_{RT}$. At this time, the current flowing through the input line is not large because the impedance is not over low. As the temperature of the thermistor increases, the resistance fast decreases to the lowest value. When the Buck-Cap is fully charged, the total power consumption does not increase a lot by the thermistor. Therefore, the thermistor indeed improves efficiency of power utilization.

However, one shortcoming in the prior arts is that the thermistor substantially still has some resistance and impedance such that the overall efficiency of the power supply can not be further improved. Moreover, high voltage elements are needed to avoid damage by inrush current, and the hardware cost thus increases. As a result, the above scheme with the thermistor in the prior arts is adverse to industrial applications.

Therefore, it is greatly needed to provide a new power supply and method of power supplying, employing a controller to manipulate a regulator to perform one of working modes of initial open circuit, power on conduction, short circuit normal operation and over-voltage open circuit protection so as to reduce inrush current upon powering on and prolong lifetime of electrical elements, thereby overcoming the above problems in the prior arts.

SUMMARY OF THE INVENTION

The primary objective of the present invention is to provide a power supply generally comprises an input charging unit, an input filtering unit, a regulating unit, a transformer, a controller, an output unit, an output capacitor, a switching unit and a feedback unit for converting an external alternating power into an output power with appropriate output voltage and electric power.

The input charging unit comprises a fuse, a first charging resistor, a second charging resistor and a charging capacitor, the regulating unit comprises a regulating capacitor and a regulator, and the transformer comprises a primary coil, an auxiliary coil and a secondary coil. In addition, the switching unit is implemented by a transistor such as power MOS with a drain, a gate and a source.

Specifically, the first and second charging resistors are connected in series, and the input charging unit is coupled to the alternating power. The connection point of the first and second charging resistors is connected to one end of the charging capacitor, and the other end of the charging capacitor is grounded. While the power supply is powered on, the charging capacitor is charged by a charging capacitor voltage through the connection point from the alternating power.

The input filtering unit is connected to the first and second charging resistors for receiving and converting the external alternating power into an input power through a filtering process. The regulating capacitor and the regulator of the regulating unit are connected in series and further couple across the input filtering unit, and one end of the regulator connected to the input filtering unit is grounded.

One end of the primary coil is connected to the input filtering unit for receiving the input power, and the auxiliary coil is configured to generate an auxiliary induced voltage through induction with the current flowing through the primary or secondary coil. Moreover, the drain is connected to the primary coil, the source connected to one end of a first sensing resistor and one end of a second sensing resistor, and the other end of the first sensing resistor is grounded. Further, the other end of the second sensing resistor is connected to one end of a sensing capacitor, and the other end of the sensing capacitor is grounded.

The controller has a controller power input port, a feedback signal port, a regulating control port, a driving port and a current sensing port. The controller power input port is connected to the connection point of the first and second charging resistors, and the auxiliary induced voltage of the auxiliary coil is connected to the controller power input port through a rectifying resistor and a rectifying diode connected in series. The regulating control port is connected to the regulator for controlling the regulator to perform one of working modes of initial open circuit, power on conduction, short circuit normal operation and over-voltage open circuit protection. The driving port is directly connected to the gate of the switching unit, or alternatively, indirectly coupled to the gate of the switching unit through a current limiting/ rectifying element. The current sensing port is connected to the other end of the second sensing resistor and the one end of the sensing capacitor.

The output unit is connected to the secondary coil for receiving and filtering a current flowing through the secondary coil to generate the output power, and the output capacitor is coupled across the output unit for stabilizing the output power.

The feedback unit is connected to the output unit for receiving the output power to generate and transmit a feedback signal to the feedback signal port of the controller so as to form a feedback loop for the controller to detect and control the output power.

More specifically, before the whole power supply is powered on, the regulator performs the working mode of initial open circuit to form an open circuit state such that the regulator capacitor is floating. When the charging capacitor voltage is larger than a start voltage, the controller starts to work and controls the regulator to perform the working mode of power on conduction for providing an electrical function of constant current source. Then, the controller further determines if the alternating power is larger than a brown in voltage. When the alternating power is larger than a brown in voltage, the controller waits for a preset period of time and then controls the regulator to perform the working mode of short circuit normal operation such that the regulator is short circuit and at the same time, a PWM (pulse width modulation) driving signal is generated to control the switching unit through the driving port. During the short circuit normal operation, the regulator is short circuit and the controller further determines if the alternating power is larger than a preset over-high voltage. When the alternating power is larger than the over-high voltage, the switching unit is turned off and the regulator is controlled to perform the working mode of over-voltage open circuit protection such that the regulator is open-circuit and a conduction path from the regulating capacitor to a grounded level is switched off.

In addition, another object of the present invention is to provide a method of power supplying for manipulating the power supply mentioned above. The method of the present invention comprises the following steps: firstly, the alternating power starts to supply after the power supply is powered on, the alternating power charges the charging capacitor to form the charging capacitor voltage, and the regulator performs the working mod of initial open circuit to form an open circuit state before the power supply is powered on such that the regulating capacitor is floating and not electrically connected to a grounded level; secondly, if the charging capacitor voltage is larger than a start voltage is determined, and when the charging capacitor voltage is determined larger than the start voltage, the controller starts to control the regulator to perform the working mod of power on conduction for providing an electrical function of constant current source; thirdly, the controller waits for a preset period of time and then controls the regulator to perform the working mod of short circuit normal operation such that the regulator is short circuit and the controller generates and transmits a PWM driving signal through the driving port to control the switching unit; fourthly, the controller during the working mod of short circuit normal operation determines if the alternating power is determined higher than an over-high voltage, and when the alternating power is higher than the over-high voltage, the controller turns off the switching unit and controls the regulator to perform the working mod of over-voltage open circuit protection such that the regulator is switched to the open circuit state, the conduction path from the regulating capacitor to the grounded level is switched off, and the output power and the charging capacitor voltage are reduced; and finally, if the charging capacitor voltage is less than an over-low voltage is determined, and when the charging capacitor voltage is determined less than the over-low voltage, return to the first step and repeat the subsequent electrical operations.

Therefore, the regulator of the present invention is connected to the regulating capacitor for controlling the path from the regulating capacitor to the grounded level such that the regulator is well controlled by the controller to correctly perform one of the working modes of initial open circuit, power on conduction, short circuit normal operation and over-voltage open circuit protection, which implement the electrical states of open circuit, constant current source, short circuit, open circuit, respectively. As a result, an over-voltage protection feature is implemented to prevent the electrical elements from damage due to higher input power. Moreover, inrush current at powering on is greatly reduced by the regulator through the controller so as to prolong lifetime of the electrical elements and particularly save the thermistor for effective hardware cost.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
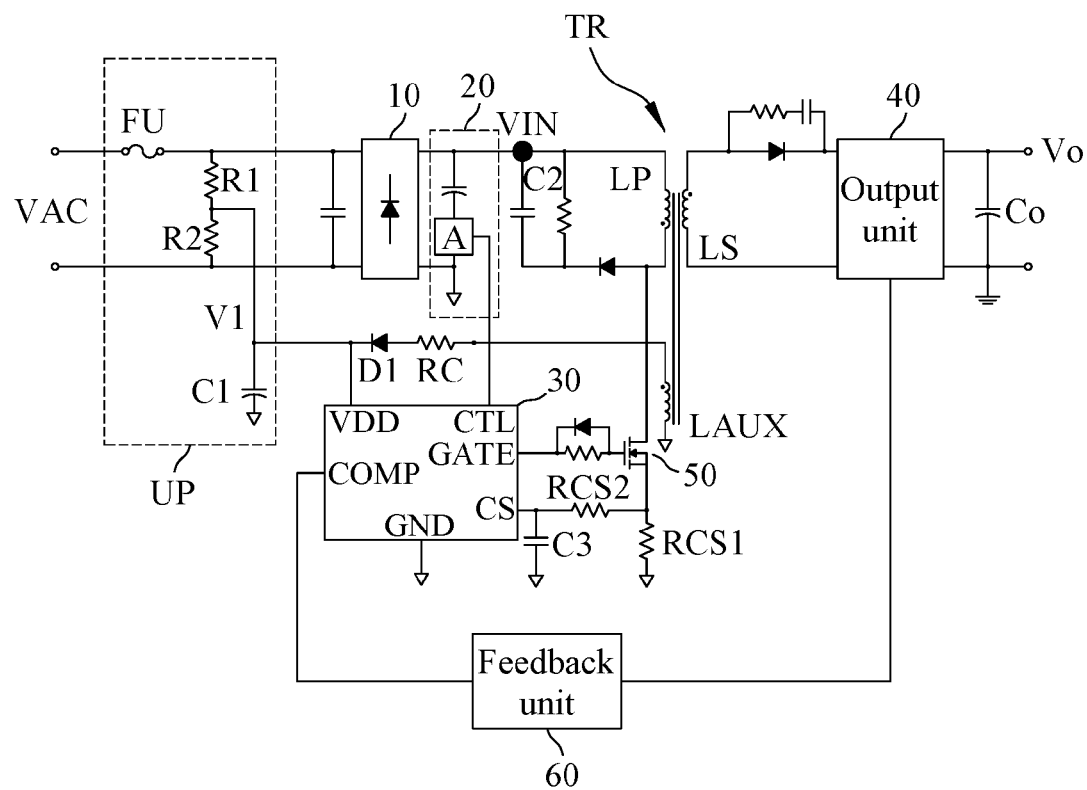
FIG. 1 is an illustrative view showing the power supply according to the first embodiment of the present invention.

Please refer to FIG. 1 showing the power supply according to the first embodiment of the present invention. As shown in FIG. 1, the power supply generally comprises an input charging unit UP, an input filtering unit 10, a regulating unit 20, a transformer TR, a controller 30, an output unit 40, an output capacitor Co, a switching unit 50 and a feedback unit 60 for converting an external alternating power VAC into an output power Vo with appropriate voltage and power. The input charging unit UP comprises a fuse FU, a first charging resistor R1, a second charging resistor R2 and a charging capacitor C1, the regulating unit 20 comprises a regulating capacitor C2 and a regulator A, and the transformer TR substantially comprises a primary coil LP, an auxiliary coil LAUX and a secondary coil LS.

Preferably, the switching unit 50 is implemented by a transistor such as power MOS (metal-oxide-semiconductor) transistor with a drain, a gate and a source. However, the MOS transistor is just one example and not intended to limit the scope of the switching unit 50. In other words, a bipolar transistor with a collector, a base and an emitter is another option. To clear explain the aspects of the present invention, the MOS transistor is selected hereinafter.

In addition, the source of the switching unit 50 is connected to one end of a first sensing resistor RCS1 and one end of a second sensing resistor RCS2, the other end of the first sensing resistor RCS1 is grounded, the other end of the second sensing resistor RCS2 is connected to one end of a sensing capacitor C3, and the other end of the sensing capacitor C3 is grounded.

Specifically, the fuse FU, the first charging resistor R1 and the second charging resistor R2 of the input charging unit UP are sequentially connected in series, and the whole input charging unit UP is coupled to the external alternating power VAC. Obviously, the first charging resistor R1 and the second charging resistor R2 implement a function of voltage division. The connection point of the first charging resistor R1 and the second charging resistor R2 is connected to one end of the charging capacitor C1 and a controller power input port VDD of the controller 30, and the other end of the charging capacitor C1 is grounded.

The input filtering unit 10 is connected to the first charging resistor R1 and the second charging resistor R2 for receiving and converting the external alternating power VAC into an input power VIN through a filtering process. However, the input filtering unit 10 can be implemented by other appropriate electrical elements like diode, capacitor and resistor, and the skill is well known. Thus, the detailed description is omitted hereinafter.

The regulating capacitor C2 and the regulator A of the regulating unit 20 are connected in series, and the regulating unit 20 is coupled across the input filtering unit 10. One end of the regulator A connected to the input filtering unit 10 is grounded. It is preferred that the regulator A is implemented by a transistor and controlled by the controller 30 through a regulating control port CTL to perform one of working modes of initial open circuit, power on conduction, short circuit normal operation and over-voltage open circuit protection.

One end of the primary coil LP of the transformer TR is connected to the input filtering unit 10 for receiving the input power VIN, and the other end of the primary coil LP is connected to the drain of the switching unit 50. The auxiliary coil LAUX generates an auxiliary induced voltage through induction with the current flowing through the primary coil LP or the secondary coil LS, and the auxiliary induced voltage is further transmitted to the controller power input port VDD of the controller 30 through a rectifying resistor RC and a rectifying diode D1 connected in series. The positive end of the rectifying diode D1 is connected to the rectifying resistor RC, and the negative end of the rectifying diode D1 is connected to the controller power input port VDD.

A driving port GATE of the controller 30 is directly connected to the gate of the switching unit 50, or alternatively, indirectly connected to the gate of the switching unit 50 through a current limiting/rectifying element for controlling the switching unit 50 to turn on/off. The current limiting/rectifying element is implemented by a diode and a resistor connected in parallel, but it is not intended to limit the scope of the present invention. In other words, other equivalent schemes to perform the similar electrical function of the current limiting/rectifying element are also included in the present invention. Specifically, when the switching unit 50 is turned on to a conduction state, a current flows through the primary coil LP and the switching unit 50 such that the auxiliary coil LAUX generates an auxiliary induced voltage through induction with the current flowing through the primary coil LP. When the switching unit 50 is turned off as open circuit, the auxiliary induced voltage is generated through induction with the current flowing through the secondary coil LS. Therefore, the key feature of the auxiliary coil LAUX is to induce with the current of the primary coil LP or the secondary coil LS when the switching unit 50 is turned on or off.

The output unit 40 is connected to the secondary coil LS for receiving and filtering a current flowing through the secondary coil LS to generate the output power Vo, and the output capacitor Co is connected to the output unit 40 for stabilizing the output power Vo.

The feedback unit 60 is connected to the output unit 40 for receiving the output power Vo to generate and transmit a feedback signal to the feedback signal port COMP of the controller 30 so as to form a feedback loop for the controller 30 to detect and control the output power Vo. Preferably, the feedback unit 60 is implemented by an optical coupler for the second side feedback, or by an additional coil coupled with the transformer TR for the primary side feedback, thereby achieving the means of isolated feedback.

More specifically, upon powering on, the alternating power VAC starts to supply, a current flows through the fuse FU, and the first charging resistor R1 and the second charging resistor R2 such that the charging capacitor C1 is charged through the connection point of the first charging resistor R1 and the second charging resistor R2 and a charging voltage V1 formed at the connection point increases. The controller 30 receives the charging voltage V1 through the controller power input port VDD as the desired power for electrical operation after powering on. However, the regulator A performs the working mode of initial open circuit to form an open circuit state such that the regulating capacitor C2 is floating and not connected to the grounded level before powering on.

The controller 30 starts to work if the charging voltage V1 is larger than a start voltage UVLO_ON, and then, the regulator A is controller by the controller 30 to perform the working mode of power on conduction such that the regulator A provides the constant current source function. The controller 30 determines whether the alternating power VAC is larger than a preset brown in voltage like 85V. When the alternating power VAC is larger than the brown in voltage, the controller 30 waits for a preset period of time and then manipulates the regulator to perform the working mode of short circuit normal operation such that the regulator A is short circuit and at the same, the PWM driving signal is generated and transmitted through the driving port GATE to control the switching unit 50. During the working mode of short circuit normal operation, the controller 30 determines if the alternating power VAC is larger than a preset over-high voltage ACOVP like 280V. When the alternating power VAC is larger than a preset over-high voltage ACOVP, the switching unit 50 is turned off and the regulator A is controlled to perform the working mode of over-voltage open circuit protection such that the regulator A is switched to the open circuit state and the conduction path from the regulating capacitor to a grounded level is switched off, thereby provide over-voltage protection for the whole power supply.

Figure 2:
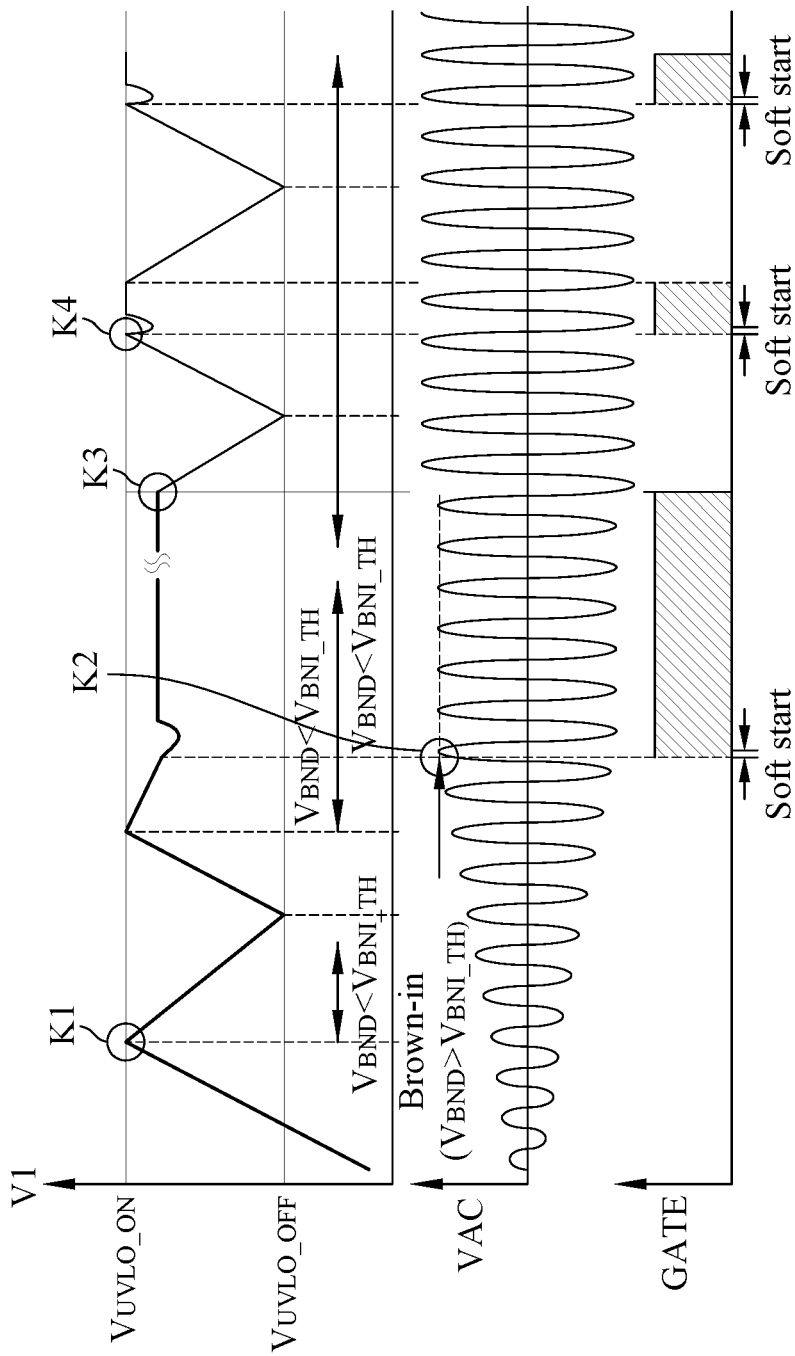
FIG. 2 is a waveform showing the electrical operation of the power supply according to the first embodiment of the present invention.

Further refer to FIG. 2 showing the operational waveform of the power supply according to the first embodiment of the present invention, As shown in FIG. 2, the region K1 indicates the charging capacitor voltage V1 is larger than the start voltage, and the controller 30 starts to work by use of the charging capacitor voltage V1, which gradually decreases. The region K2 represents the alternating power VAC reaches the brown in voltage, and the controller 30 generates the PWM driving signal to drive the switching unit 50 through the driving port GATE. The region K3 refers to the alternating power VAC higher than the over-high voltage such that the switching unit 50 is turned off by the controller 30. Additionally, the region K4 means the charging capacitor voltage V1 is larger than the start voltage, and the controller 30 re-generates the PWM driving signal.

Thus, the power supply according to the first embodiment of the present invention prevents the electrical elements from damage due to tens or even hundreds of ampere of inrush current occurring at initially powering on, and also provides over-voltage protection during subsequent normal operation.

Figure 3:
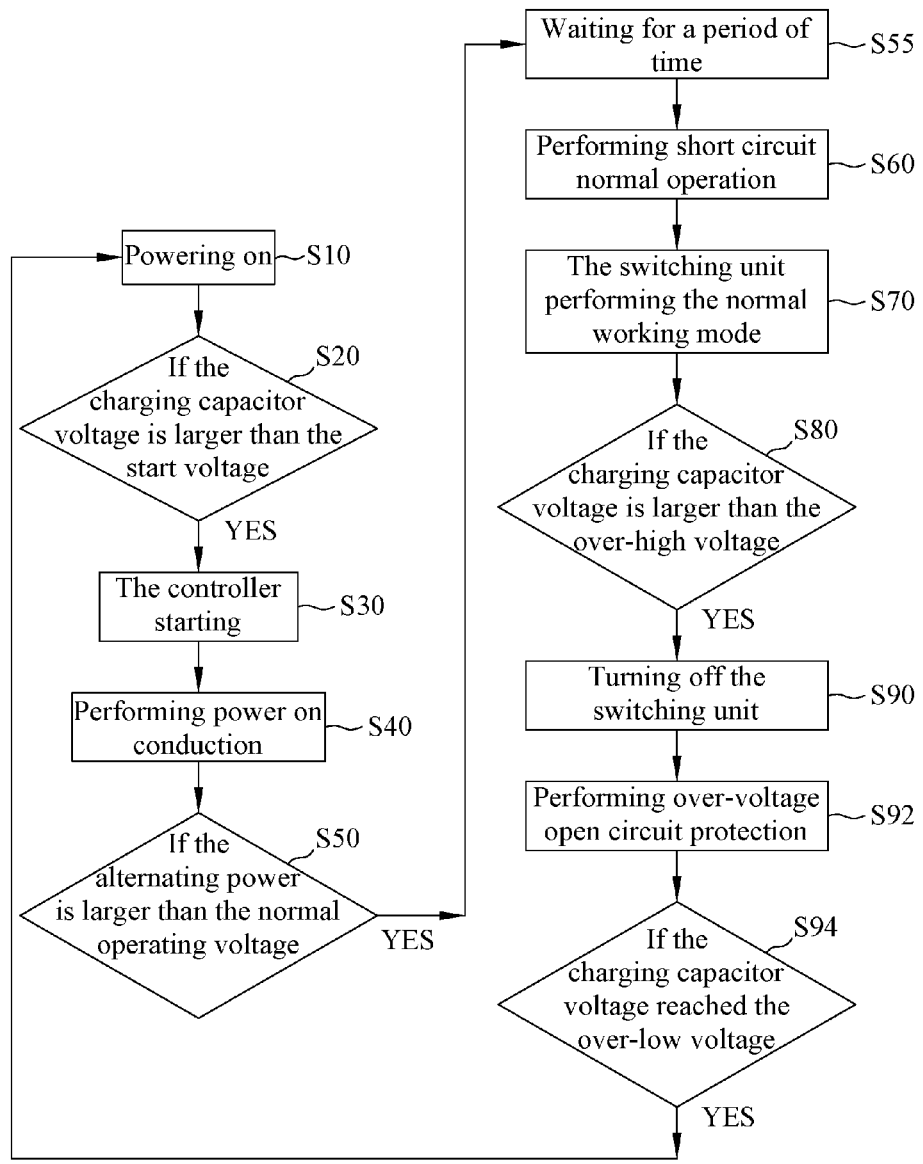
FIG. 3 is a flowchart showing the method of power supplying according to the second embodiment of the present invention.

Please refer to FIG. 3 showing the operational flowchart for the method of power supplying according to the second embodiment of the present invention. The method of power supplying comprises the steps S10, S20, S30, S40, S50, S55, S60, S70, S80, S90, S92 and S94 for converting the alternating power into the output power. It should be noted that the method the second embodiment employs the power supply shown in FIG. 1 to implement the function of power supplying, and the detailed description about the hardware of the power supply is omitted hereinafter.

Firstly, the method of power supplying begins at the step S10, in which the power supply is powered on and the alternating power VAC starts to supply. At this time, the alternating power VAC charges the charging capacitor C1 to form the charging capacitor voltage V1. Before powering on, the regulator A performs the working mode of initial open circuit to stay at the open circuit state such that the regulating capacitor C2 is floating and not connected to the grounded level.

Next, in the step S20, determine if the charging capacitor voltage V1 is larger than the over-low voltage. When the charging capacitor voltage V1 is larger than the over-low voltage, the step S30 is performed, and the controller 30 starts to work and the step S40 is executed such that the regulator A is controlled by the controller 30 to perform the working mode of power on conduction, in which the constant current source function is provided.

After the step S40, the step S55 is directly performed or alternatively, the step S50 is first executed and then the step S55, depending on actual requirement. FIG. 3 is just an illustrative example showing that the steps S50 and S55 are sequentially performed.

In the step S50, the controller 30 determines if the alternating power VAC is larger than the preset brown in voltage. When the alternating power VAC is larger than the preset brown in voltage, the step S55 is executed to control the regulator A to maintain the constant current source function. After the preset period of time, the step S60 is performed and the regulator A is controlled by the controller 30 to perform the working mode of short circuit normal operation such that the regulator A is short circuit and the step S70 is performed to cause the controller 30 to generate the PWM driving signal to drive the switching unit 50 through the driving port GATE.

It should be particularly noted that the effect of waiting for the period of time in step S55 is to assure that the charging capacitor C2 is fully charged so as to avoid inrush current when the working mode of short circuit normal operation is switched on in the step S60. Thus, the controller 30 adjusts the period of time based on actual electrical properties.

Next, in the step S80, the controller 30 determines if the alternating power VAC is larger than the over-high voltage. When the alternating power VAC is larger than the over-high voltage, the step S90 is performed to turn off the switching unit 50, and then the step S92 is executed to cause the regulator A to perform the working mode of over-voltage open circuit protection such that the regulator A is switched to the open circuit state, thereby switching off the conduction path from the charging capacitor C2 to the grounded level. The output power Vo is thus reduced to achieve the purpose of over-voltage protection. At this time, the charging capacitor voltage V1 decreases.

The step S94 is then performed to determine if the charging capacitor voltage V1 is lower than the over-low voltage. When the charging capacitor voltage V1 is lower than the over-low voltage, return to the step S10 and repeat the subsequent electrical operations as mention above.

From the above mention, one primary feature of the present invention is that the regulator connected to the regulating capacitor is employed to control the conduction path from the charging capacitor to the grounded level such that the regulator is controlled by the controller to operate at one of the working modes including initial open circuit, power on conduction, short circuit normal operation or over-voltage open circuit protection for exhibiting the electrical states of open circuit, constant current source, short circuit and open circuit, respectively. Since the regulator is switched to the working mode of over voltage open circuit protection when the generated voltage from the input rectifying unit is too high, the conduction path from the charging capacitor C2 to the grounded level is switching off to prevent the electrical elements from damage due to huge input voltage, thereby proving over-voltage protection. The function of over-voltage protection is intended to switch off the conduction path from the charging capacitor C2 to the grounded level such that the present invention is allowed to utilize the electrical elements with less endurance for voltage impact, such as the regulating capacitor, the switching unit, and so forth. Obviously, reliability and endurance in actual operation are greatly improved.

In addition, another feature of the present invention is that the regulator is controlled by the controller to greatly reduce inrush current at powering on so as to prolong lifetime of the electrical elements and particularly save the thermistor for effective hardware cost. Thus, the present invention possesses the competitive edge in the market competition and industrial utility. The controller can also be implemented by a microcontroller or a central processing unit, which executes firmware or software program in a digital process to perform the desired electrical operations, but it is not intended to limit the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power supply for converting an external alternating power into an output power, comprising:
    an input charging unit comprising a fuse, a first charging resistor, a second charging resistor and a charging capacitor, the first and second charging resistors connected in series and configured to receive the external alternating power, a connection point of the first and second charging resistors connected to one end of the charging capacitor, the other end of the charging capacitor grounded, the charging capacitor charged by a charging capacitor voltage through the connection point from the external alternating power at initially powering on;

an input filtering unit connected to the first and second charging resistors for receiving and converting the external alternating power into an input power through a filtering process;

a regulating unit connected to the input filtering unit and comprising a regulating capacitor and a regulator connected in series, one end of the regulator connected to the input filtering unit being grounded;

a transformer comprising a primary coil, an auxiliary coil and a secondary coil, one end of the primary coil connected to the input filtering unit for receiving the input power, the auxiliary coil generating an auxiliary induced voltage through induction with a current flowing through the primary or secondary coil;

a switching unit implemented by a transistor and having a drain, a gate and a source, the drain connected to the primary coil, the source connected to one end of a first sensing resistor and one end of a second sensing resistor, the other end of the first sensing resistor grounded, the other end of the second sensing resistor connected to one end of a sensing capacitor, the other end of the sensing capacitor being grounded;

a controller having a controller power input port, a feedback signal port, a regulating control port, a driving port and a current sensing port, the controller power input port connected to the connection point of the first and second charging resistors, the auxiliary induced voltage of the auxiliary coil connected to the controller power input port through a rectifying resistor and a rectifying diode connected in series, the regulating control port connected to the regulator for controlling the regulator to perform one of working modes of initial open circuit, power on conduction, short circuit normal operation or over-voltage open circuit protection, the driving port directly connected to the gate of the switching unit or indirectly connected to the gate of the switching unit through a current limiting/rectifying element, the current sensing port connected to the other end of the second sensing resistor and the one end of the sensing capacitor;

an output unit connected to the secondary coil for receiving and filtering a current flowing through the secondary coil to generate the output power;

an output capacitor connected to the output unit for stabilizing the output power; and a feedback unit connected to the output unit for receiving the output power to generate and transmit a feedback signal to the feedback signal port of the controller so as to form a feedback loop for the controller to detect and control the output power.

2. The power supply as claimed in claim 1, wherein the feedback unit comprises a optical coupler or a transformer auxiliary coil for providing a means of isolated feedback, the regulator is implemented by a transistor, and the current limiting/rectifying element is formed of a diode and a resistor connected in parallel.

3. The power supply as claimed in claim 1, wherein the regulator performs the working mode of initial open circuit before the power supply is powered on to form an open circuit state such that the regulator capacitor is floating, the controller starts to work and controls the regulator to perform the working mode of power on conduction for providing an electrical function of constant current source when the charging capacitor voltage is larger than a start voltage, the controller waits for a preset period of time and then controls the regulator to perform the working mode of short circuit normal operation such that the regulator is short-circuited and a PWM (pulse width modulation) driving signal is generated and used to control the switching unit through the driving port, the controller determines if the alternating power is larger than a preset over-voltage during the working mode of short circuit normal operation, the switching unit is turned off and the regulator is controlled to perform the working mode of over-voltage open circuit protection when the alternating power is larger than a preset over-voltage such that the regulator is open-circuit and a conduction path from the regulating capacitor to a grounded level is switched off.

4. The power supply as claimed in claim 3, wherein the controller waits for a preset period of time and then determines if the alternating power is larger than a brown in voltage before the regulator performs the working mode of short circuit normal operation, and the regulator is controlled to maintain the electrical function of constant current source when the alternating power is larger than the brown in voltage.

5. A method of power supplying for converting an external alternating power into an output power through a power supply comprising an input charging unit, an input filtering unit, a regulating unit, a transformer, a controller, an output unit, an output capacitor, a switching unit and a feedback unit, the input charging unit comprising a fuse, a first charging resistor, a second charging resistor and a charging capacitor, the fuse, the first charging resistor and the second charging resistor sequentially connected in series and further coupled to the alternating power, a connection point of the first and second charging resistors connected to one end of the charging capacitor, the other end of the charging capacitor grounded, the charging capacitor charged by a charging capacitor voltage through the connection point from the external alternating power at an initial power on, the input filtering unit connected to the first and second charging resistors for receiving and converting the external alternating power into an input power through a filtering process, the regulating unit connected to the input filtering unit and comprising a regulating capacitor and a regulator connected in series, one end of the regulator connected to the input filtering unit being grounded, the transformer comprising a primary coil, an auxiliary coil and a secondary coil, one end of the primary coil connected to the input filtering unit for receiving the input power, the auxiliary coil generating an auxiliary induced voltage through induction with a current flowing through the primary or secondary coil, the switching unit implemented by a transistor and having a drain, a gate and a source, the drain connected to the primary coil, the source connected to one end of a first sensing resistor and one end of a second sensing resistor, the other end of the first sensing resistor grounded, the other end of the second sensing resistor connected to one end of a sensing capacitor, the other end of the sensing capacitor being grounded, the controller having a controller power input port, a feedback signal port, a regulating control port, a driving port and a current sensing port, the controller power input port connected to the connection point of the first and second charging resistors, the auxiliary induced voltage of the auxiliary coil connected to the controller power input port through a rectifying resistor and a rectifying diode connected in series, the regulating control port connected to the regulator for controlling the regulator to perform one of working modes of initial open circuit, power on conduction, short circuit normal operation and over-voltage open circuit protection, the driving port directly connected to the gate of the switching unit or indirectly connected to the gate of the switching unit through a current limiting/rectifying element, the current sensing port connected to the other end of the second sensing resistor and the one end of the sensing capacitor, the output unit connected to the secondary coil for receiving and stabilizing a current flowing through the secondary coil to generate the output power, the output capacitor connected to the output unit for filtering the output power, the feedback unit connected to the output unit for receiving the output power to generate and transmit a feedback signal to the feedback signal port of the controller so as to form a feedback loop for the controller to detect and control the output power, the method comprising:

a first step, in which the alternating power starts to supply after the power supply is powered on, the alternating power charges the charging capacitor to form the charging capacitor voltage, the regulator performs the working mod of initial open circuit to form an open circuit state before the power supply is powered on such that the regulating capacitor is floating and not electrically connected to a grounded level;

a second step, in which if the charging capacitor voltage is larger than a start voltage is determined, and when the charging capacitor voltage is larger than the start voltage, the controller starts to control the regulator to perform the working mod of power on conduction for providing an electrical function of constant current source;

a third step, in which the controller waits for a preset period of time and then controls the regulator to perform the working mod of short circuit normal operation such that the regulator is short circuit and the controller generates and transmits a PWM driving signal through the driving port to control the switching unit;

a fourth step, in which the controller during the working mod of short circuit normal operation determines if the alternating power is higher than an over-high voltage, and when the alternating power is higher than the over-high voltage, the controller turns off the switching unit and controls the regulator to perform the working mod of over-voltage open circuit protection such that the regulator is switched to an open circuit state, a conduction path from the regulating capacitor to a grounded level is switched off, and the output power and the charging capacitor voltage are reduced; and a fifth step, in which if the charging capacitor voltage is less than an over-low voltage is determined, and when the charging capacitor voltage is less than the over-low voltage, the first step is performed and electrical operations in the subsequent steps are repeated.

6. The method of power supplying as claimed in claim 5, wherein the third step further comprises the controller determining if the alternating power is larger than a brown in voltage after the second step, and when the alternating power is larger than the brown in voltage, the regulator is controlled to maintain the electrical function of constant current source.

7. The method of power supplying as claimed in claim 5, wherein the regulator is implemented by a transistor, the current limiting/rectifying element is formed of a diode and a resistor connected in parallel, and the feedback unit comprise a optical coupler or a transformer auxiliary coil for providing a means of isolated feedback.

\* \* \* \* \*